US006668711B1

United States Patent
Villiger

(10) Patent No.: US 6,668,711 B1
(45) Date of Patent: Dec. 30, 2003

(54) ELASTIC ROLLER, METHOD FOR PRODUCING SAME DEVICE FOR SMOOTHING PAPER AND METHOD FOR SMOOTHING PAPER

(75) Inventor: Patrick Villiger, Lucerne (CH)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 278 days.

(21) Appl. No.: 09/585,624

(22) Filed: Jun. 2, 2000

(30) Foreign Application Priority Data

Jun. 2, 1999  (DE) .......................................... 199 25 420

(51) Int. Cl.[7] .............................................. B30B 11/22
(52) U.S. Cl. ..................... 100/41; 100/163 R; 100/169; 492/48; 492/54
(58) Field of Search ............................. 100/155 R, 35, 100/176, 163 R, 168, 169, 162 R; 492/33, 36, 56, 48, 54

(56) References Cited

U.S. PATENT DOCUMENTS

| 4,242,954 A | * | 1/1981 | McDaniel ................... 100/176 |
| 4,390,599 A | | 6/1983 | Broyles |
| 4,576,845 A | | 3/1986 | Krotchko |
| 5,023,985 A | * | 6/1991 | Salo et al. ..................... 492/53 |
| 5,176,940 A | | 1/1993 | Salo et al. |
| 5,233,921 A | | 8/1993 | John |
| 5,240,666 A | | 8/1993 | Schnyder et al. |
| 5,308,370 A | * | 5/1994 | Kraft et al. .................. 280/736 |
| 5,393,290 A | | 2/1995 | Lehmann et al. |
| 5,746,124 A | * | 5/1998 | Kayser .................... 100/155 R |
| 5,887,517 A | * | 3/1999 | Liang et al. ............. 100/155 R |
| 6,039,840 A | * | 3/2000 | Kytonen et al. ........ 100/155 R |
| 6,244,171 B1 | * | 6/2001 | Kayser .................... 100/155 R |

FOREIGN PATENT DOCUMENTS

GB            795523      *  5/1958

* cited by examiner

*Primary Examiner*—Allen Ostrager
*Assistant Examiner*—Shelley Self
(74) *Attorney, Agent, or Firm*—Greenblum & Bernstein, P.L.C.

(57) ABSTRACT

The present invention concerns an elastic roller for smoothing a paper web, wherein the roller has a hard metal core, an elastic matrix coating material thereon and an outer layer of memory metal, and is comprised especially of metal is described. The present invention also relates to a method for producing the elastic roller and to a device and method for smoothing paper comprising passing a paper web through a pressure nip formed by the elastic roller core and a hard roll.

38 Claims, 1 Drawing Sheet

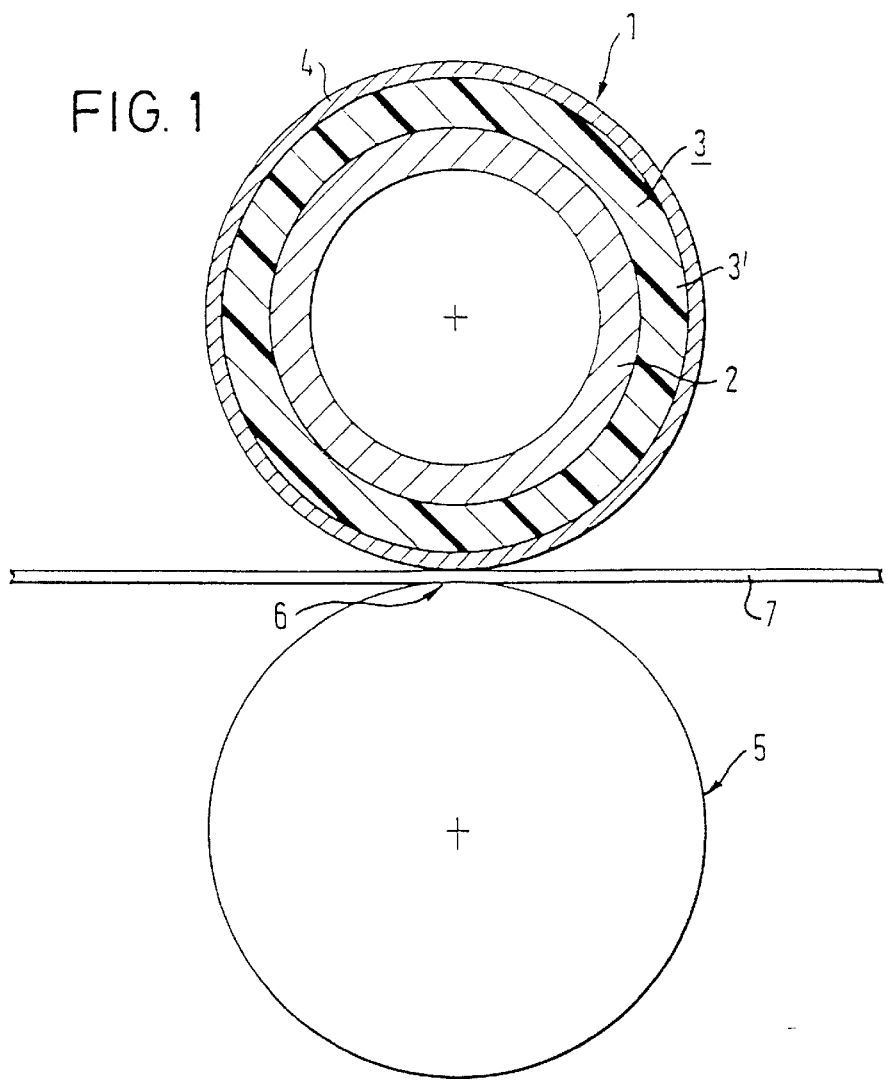
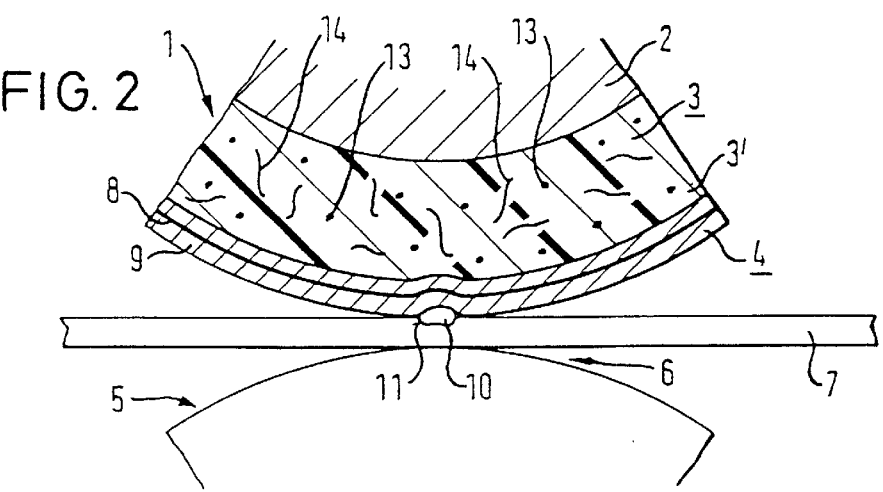

ELASTIC ROLLER, METHOD FOR PRODUCING SAME DEVICE FOR SMOOTHING PAPER AND METHOD FOR SMOOTHING PAPER

CROSS-REFERENCE TO RELATED APPLICATIONS

The present application claims priority under 35 U.S.C. § 119 of German Patent Application No. 199 25 420.6, filed on Jun. 2, 1999, the disclosure of which is expressly incorporated by reference herein in its entirety.

BACKGROUND OF THE INVENTION

1. Field of the Invention

The present invention relates to a roller, which is especially useful for smoothing paper webs. The roller has a hard roller core formed of metal and an outer side having an elastic coating layer formed of an elastic matrix material. The present invention also relates to a method for producing such a roller.

2. Discussion of Background Information

Elastic rollers are used in glazing paper webs. For this purpose, one elastic roller and one hard roller together form a pressing nip through which a paper web to be processed is guided. The hard roller has a very smooth surface made of, for example, steel or chilled iron and smooths the side of the paper web facing it. The elastic roller acting on the opposite side of the paper web increases uniformity and effects compression of the paper web in the pressing nip. The length of each roller is within the range of about 3 to about 12 meters and the diameter of each roll is within the range of about 450 to about 1500 mm. The rollers are able to withstand linear forces of up to about 600 N/mm and compressive strain of up to about 130 N/mm$^2$.

The trend in paper manufacture is to perform the glazing in online operation, i.e., the paper web leaving the paper machine or the coating machine is directly guided through the paper smoothing device (calender). The rollers of the smoothing device require higher temperature resistance than the prior art rollers, e.g., due to increased roller temperatures resulting from a number of factors, such as high transport speeds of the paper web required for online operation, resulting high rotation speeds of the calender rollers, and increased nip frequency, i.e., the frequency with which the coating is compressed and released again. The high temperatures resulting from online operation may cause problems, such as the destruction of the plastic coating in prior art elastic rollers. On the one hand, prior art plastic coatings have acceptable maximum temperature differentials of approximately 20° C. over the width of the rollers. On the other hand, the plastic materials conventionally used for the coating have a substantially higher thermal expansion coefficient than the conventionally employed steel rollers or chilled iron rollers. This is undesirable because a temperature increase causes high axial stress between the steel roller or the chilled iron roller and the plastic coating connected therewith.

These high stresses together with especially localized heat points within the plastic coating may result in so-called hot spots, which may be located where a detachment or even a rupture of the plastic layer will occur.

In addition to mechanical stresses and relatively high temperatures causing hot spots, hot spots may also occur especially when crystallization points are present. Crystallization points may result from faulty adhesive connections or deposits, or from above average indentations of the elastic coating which may be caused by folds or foreign bodies on the paper web. As a consequence, the temperature at these crystallization points may increase from a conventional range of between about 80° C. and 90° C. to about 150° C., thereby resulting in the aforementioned destruction of the plastic layer.

DE-A-4126232 discloses a roller whose elastic coating layer is provided with an additional metal coating. The metallic cover layer increases the thermal conductivity at the outer side of the roller so that undesirable heat occurring within the pressing nip may be quickly dissipated, thereby keeping substantially constant the temperature during treatment of the material web.

The metallic cover layer, however, has a disadvantage, when disturbance locations occur within the pressing nip which disturbance locations may be caused by contaminations within the material web, or by foreign bodies entering the pressing nip or folds within the material web. The disturbance locations may also be caused by impressions or depressions created in the metallic cover layer, which impressions or depressions may possibly be irreversible. These depressions represent disturbance locations in the highly polished surface of the elastic roller and result in markings, which are irregularities in the surface of the smoothed material web.

SUMMARY OF THE INVENTION

The present invention provides an elastic roller which has good thermal conductivity at least at its surface and which prevents the risk of the occurrence of markings. The present invention also provides for a method for producing such a roller.

The present invention further relates to an elastic roller whose outer side of matrix material is coated with a memory metal. The present invention,relates to a method for applying at least one layer of a memory metal to the coating layer, i.e., onto the outer side of the matrix material.

Employing a memory metal as a cover layer of the elastic coating layer results in the depressions of the cover layer, which occur at disturbance locations during operation, being reversible, i.e., a self-healing of the surface of the elastic roller is realized. Memory metal, which is also referred to as shape memory alloy, has the property upon heating to a certain temperature to take on a predetermined shape memorized in the metal. The present invention makes it possible to produce the cover layer of memory metal such that the cover layer takes on its predefined, concentric shape with extremely smooth surface over its entire extension at the temperatures occurring during the smoothing operation. When a disturbance, such as a foreign body, a contamination of the paper web or a fold in the paper web, causes a depression in the cover layer, the cover layer, after removal of the disturbance, again takes on its original shape. Thus, the depression in the surface of the cover layer disappears automatically after the disturbance location has passed through and the surface of the elastic roller is again optimally smooth because of the memory effect.

The temperature at which the shape memory alloy again takes on its original shape may be selected to be higher than the operating temperature in the pressing nip. Thus, depressions occurring during operation within the cover layer are not automatically repaired during the on-going operation, but rather are repaired after shutdown of the on-going operation. After shut-down, the temperature of the cover layer may be increased to the required temperature, without removing the roller from the smoothing device, to affect the repair of the cover layer.

The metallic cover layer also provides very good thermal conductivity in the outer side of the elastic roller, thereby quickly dissipating to the exterior undesirable heat occurring within the pressing nip. This ensures that the temperature during the treatment of the material web in the pressing nip may be kept substantially constant.

According to another embodiment of the present invention, the memory metal layer may be composed of a nickel-titanium alloy. In principle, any other shape memory alloy is suitable for the manufacture of the cover layer as long as the alloy provides the desired smoothness of the surface of the elastic roller. Advantageously, the temperature at which the shape memory alloy takes on its original shape may be below the operating temperature in the pressing nip in order to allow the mentioned automatic self-healing.

In accordance with a preferred embodiment of the present invention, the memory metal layer may have a radial thickness of between approximately 2 $\mu$m and 30 $\mu$m, and preferably between approximately 5 $\mu$m and 10 $\mu$m. The indicated thickness values ensure that the roller has the required elasticity for the smoothing process despite the cover layer being formed of metal.

According to another preferred embodiment of the present invention, the surface of the memory metal layer has a roughness value, Ra value, that is smaller than about 0.05 $\mu$m, especially smaller than about 0.03 $\mu$m. The indicated Ra values provide a surface quality of the elastic roller which is significantly higher than in the prior art rollers having only a plastic material surface and significantly improve the smoothing effect in comparison to those prior art rollers.

Advantageously, fillers may be embedded in the matrix material of the elastic layer. By using these fillers in the form of powder and/or fiber-shaped, the properties of the elastic coating layer may be controlled. The quantity and physical properties of these fillers may affect the physical properties of the elastic coating layer. For example, one may adjust the stiffness of the elastic coating layer by using fillers, which have a greater stiffness than the matrix material. Furthermore, one may improve the thermal conductivity of the elastic coating layer by using fillers having a thermal conductivity which is greater than the thermal conductivity of the matrix material. The good thermal conductivity of the metallic cover layer makes it possible to dissipate quickly and safely undesirable heat which occurs within the matrix material.

Moreover, according to another embodiment of the present invention, the thermal expansion coefficient of the fillers may be smaller than the thermal expansion coefficient of the matrix material, and, may be substantially of the same magnitude as the thermal expansion coefficient of the roller core. Thus, the total thermal expansion coefficient of the elastic coating layer is reduced relative to the thermal expansion coefficient of the matrix material, thereby reducing the longitudinal stress between the roller core and the elastic coating layer resulting from the heat produced during operation.

The fillers may preferably be selected from carbon, glass, metal or mixtures thereof. Moreover, the fillers may advantageously be in the form of fibers or rovings. At least a portion of the fibers may be oriented in the axial direction and/or radial direction or may be oriented by statistical distribution. The stiffness or the elasticity of the coating layer may be adjusted by the fillers and fibers, i.e., by selecting the particular fillers as well as by orienting the fibers. The fibers may be arranged in one or more especially concentrically arranged fiber layers. Moreover, it is possible that further fillers, especially in the form of fibers or powder, may be arranged in the matrix material in order to affect the physical properties of the coating layer in the desired way.

To produce the memory metal layer, at least one fiber bundle, formed from a plurality of memory metal fibers or fibers coated with memory metal, is advantageously wound onto the coating layer, especially in multiple stacked fiber layers. In this manner, the fiber bundle is preferably formed from one or more fiber rovings and/or from a fiber fleece wherein each roving has a plurality of adjacently positioned fibers of the same kind. The fiber bundle or the individual fibers may be coated before winding onto the coating layer by pulling the fiber bundle or the individual fibers through a memory metal bath. It is also possible to wind the fiber bundle or the fibers substantially dry onto the coating layer and to coat or supply the memory metal during or after winding. The fibers may be soft synthetic fibers and may be made of aramide.

In addition to the application of the memory metal layer via fibers or fiber bundles, it is also possible to apply the cover layer in a different way, such as by vapor deposition, spraying, etc.

Advantageously, the surface of the memory metal layer is ground and optionally polished after application of the metal onto the coating layer. In this way, an extremely smooth surface may be formed on the elastic roller.

The present invention concerns a roller for smoothing a paper web having a hard metal roller core, an elastic coating layer coated upon the core roll, the elastic coating layer comprising an elastic matrix material, and a memory metal layer covering an outer side of the elastic layer. The memory metal layer may contain nickel-titanium alloy and may have a radial thickness between about 2 $\mu$m and about 30 $\mu$m, and preferably a radial thickness between about 5 $\mu$m and about 10 $\mu$m. The surface of the memory metal layer may have a Ra value which is less than about 0.05 $\mu$m, and preferably a Ra value which is less than about 0.03 $\mu$m.

The roller according to the present invention may have at least one filler embedded in the elastic matrix layer. The at least one filler may have a greater stiffness than a stiffness of the elastic matrix material and may have a greater thermal conductivity than a thermal conductivity of the matrix material. The at least one filler may also have a thermal expansion coefficient less than a thermal expansion coefficient of the matrix material and may be essentially of a same magnitude as a thermal expansion coefficient of the roller core.

The at least one filler may contain at least one of carbon, glass, and metal and may be fiber or roving. The fiber may contain aramide.

The elastic matrix layer of the roller may contain at least a portion of the fiber oriented in an axial direction, and preferably at least a preponderant portion of the fiber oriented in an radial direction. The elastic matrix layer of the roller may contain at least a portion of the fiber oriented by statistical distribution, and preferably at least a preponderant portion of the fiber oriented by statistical distribution. The elastic matrix layer of the roller may also contain the fiber arranged in a fiber layer, and preferably arranged in radially stacked fiber layers.

The elastic coating layer may contain at least one further filler having one of a fiber and a powder and the at least one further filler may be composed of at least one of quartz and polytetrafluoroethylene.

The matrix material of the elastic coating layer may be a plastic material having one of thermosetting resin and thermoplastic material and may be a resin/hardener combination.

The present invention also relates to a roller for smoothing a paper web having a hard metal roller core, an elastic coating layer coated upon the core roll, the elastic coating layer having an elastic matrix material with at least one filler embedded therein, and a memory metal layer covering an outer layer of the elastic coating layer, wherein the memory metal layer is deformable and is adapted to return to an original shape.

The memory metal layer may be made of nickel-titanium alloy. The memory metal layer may contain one of a plurality of metal fibers. The memory metal layer may contain a plurality of metal coated aramide fibers. The memory metal layer may have a radial thickness between about 5 $\mu$m and about 10 $\mu$m and the surface of the memory metal layer may have a Ra value which is less than about 0.03 $\mu$m.

The at least one filler, which is embedded in the elastic matrix material, may have a greater stiffness than a stiffness of the elastic matrix material, a greater thermal conductivity than a thermal conductivity of the matrix material, and may have a thermal expansion coefficient less than a thermal expansion coefficient of the matrix material and may be essentially of a same magnitude as a thermal expansion coefficient of the roller core.

The present invention also relates to a device for smoothing a paper web having an elastic roller which may have a hard metal roller core, an elastic coating layer, including an elastic matrix material, coated upon the core roll, and a memory metal layer covering the elastic coating layer; a hard roller; and a pressure nip formed between the elastic roller and the hard roller; wherein the memory metal layer is deformable and adapted to resume its original shape.

In the device, at least one filler may be embedded in the elastic matrix layer, and the at least one filler may have a greater thermal conductivity than the thermal conductivity of the matrix material and may have a thermal expansion coefficient less than the thermal expansion coefficient of the matrix material and may be essentially of the same magnitude as the thermal expansion coefficient of the roller core.

The present invention also relates to a method for producing an elastic roller having a hard metal roller core comprising: coating the metal roller core with an elastic layer comprising an elastic matrix material with at least one filler, and covering an outer surface of the elastic layer with at least one memory metal layer. The at least one filler may be fiber or powder and may be one of carbon and glass and may be embedded in the matrix material. Covering the outer surface of the elastic layer may include winding at least one fiber bundle having a plurality of metal fibers onto the outer surface. The at least one fiber bundle may be wound in several stacked fiber layers. The fiber bundle may contain one or more fiber rovings, wherein each roving may contain a plurality of adjacently positioned fibers of the same kind.

In the method, coating the outer surface layer may include winding at least one fiber bundle having a plurality of metal-coated fibers onto the outer surface and the at least one fiber bundle may be wound in several stacked fiber layers. Each fiber bundle may contain one or more fiber rovings, wherein each roving has a plurality of adjacently positioned fibers of the same kind. The fiber bundle may also contain fiber fleece.

In the method, the fiber bundle may be coated with memory metal before winding onto the covered elastic layer, preferably by passing the fiber bundle through a memory metal bath before the winding.

In the method, covering the outer surface of the elastic layer may include winding at least one fiber bundle having a plurality of synthetic fibers onto the outer surface, and may include coating the plurality of synthetic fibers with memory metal during winding.

The synthetic fibers may be made of aramide.

In the method, covering the outer surface of the elastic layer may include winding at least one fiber bundle having a plurality of synthetic fibers onto the outer surface, and may include winding the synthetic fibers substantially dry onto the elastic coating layer, and coating the plurality of synthetic fibers with memory metal after winding. The synthetic fibers may be aramide fibers.

In the method, the coated memory layer may be ground to smooth the surface of memory metal layer and may be polished to smooth the surface of memory metal layer. The surface may have a Ra value which is less than 0.03 $\mu$m.

The present invention also concerns a method for smoothing a paper web comprising passing the paper web through a pressure nip formed between an elastic roller which comprises a hard metal roller core, an elastic coating layer, including an elastic matrix material, coated upon the core roll, and a memory metal layer covering the elastic coating layer and a hard roller, wherein the memory metal layer is deformable and adapted to resume its original shape, and smoothing the paper web.

The elastic matrix layer may contain at least one filler embedded therein and the at least one filler, which may be fiber or roving, may have a greater stiffness than a stiffness of the elastic matrix material. The at least one filler may have a greater thermal conductivity than a thermal conductivity of the matrix material, and may have a thermal expansion coefficient less than a thermal expansion coefficient of the matrix material and essentially of a same magnitude as a thermal expansion coefficient of the roller core.

The method may include heating the memory metal layer to a temperature greater than a temperature at which the memory layer is deformed, whereby the memory metal layer resumes its original shape.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 illustrates a schematic cross-sectional view of an elastic roller embodied according to the present invention as well as a hard roller cooperating therewith and a paper web arranged between the rollers; and FIG. 2 illustrates a detail view of the device according to FIG. 1 with a foreign body positioned within the pressing nip.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows an elastic roller 1 in accordance with the present invention which has roller core 2, elastic coating layer 3, and cover layer 4. Roller core 2 may be formed from steel or chilled iron. Elastic coating layer 3 may be formed from elastic matrix material 3', which may be an elastic plastic material such as a resin-hardener combination. Cover layer 4 may be applied onto the surface of the coating layer and formed with a memory metal. The size and thickness ratios of the elements depicted in FIG. 1 do not correspond to the actual ratios, but rather have been selected only for the purpose of illustration. For example, cover layer 4 in reality may have a thickness of about 10 μm and would not be visible if a representation were true to scale.

Hard roller 5 is below elastic roller 1 and may be formed from steel or chilled iron. Hard roller 5 is arranged with elastic roller 1 to form pressing nip 6. Material web 7, such as a paper web, is guided through pressing nip 6 and the surface of the material web is smoothed by pressure occurring within pressing nip 6, and preferably with simultaneous heat application.

FIG. 2 shows that cover layer 4 may be formed from one or more fiber layers 8 which are each formed from fibers or fiber rovings coated with memory metal. Coating 9 of fiber layers 8 in this case contains a memory metal so that cover layer 4 is formed from a combination of memory metal coating 9 and fiber layers 8.

Moreover, the detail view of FIG. 2 shows that fillers in the form of powder 13 as well as fibers 14 are embedded in elastic matrix material 3' of coating layer 3. The stiffness of coating layer 3 may be adjusted by fillers 13 and 14.

FIG. 2 also depicts foreign body 10, which is arranged on material web 7 in pressing nip 6, and which produces depression 11 in the cover layer 4.

If depression 11 were irreversibly produced in cover layer 4, each revolution of elastic roller 1 would produce margins on the surface of material web 7, thereby reducing the surface quality of the smooth material web.

In accordance with the present invention, depression 11 may be eliminated from elastic roller 1 by heating cover layer 4 to a temperature which is above the temperature at which the memory metal of cover layer 4 takes on the original shape. The selection of the temperature for heating cover layer 4 will depend on the particular memory metal. The heating of cover layer 4 may result from the heat generated during the smoothing operation. Alternatively, the heating of cover layer 4 may occur after shutdown of the smoothing device where the heating takes place in a separate repair process. After heating, cover layer 4 will take on its original concentric cylinder shape without depression 11.

In this manner it is ensured that the depressions in cover layer 4 which are produced, for example, by foreign bodies, folds in the material web or other irregularities of the material web, are not irreversible but may be eliminated automatically or with minimal expenditure by a local repair, and in particular without removal of elastic roller 1 from the smoothing device, so that the surface of the elastic roller 1 may again assume its predetermined, desired smooth surface.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMERALS

1 Elastic roller
2 Roller core
3 Elastic coating layer
3' Matrix material
4 Cover layer
5 Hard roller
6 Pressing nip
7 Material web
8 Fiber layers
9 Coating
10 Foreign body
11 Depression

What is claimed is:

1. A roller for smoothing a paper web comprising:
   a hard metal roller core;
   an elastic coating layer coated upon the roller core, the elastic coating layer comprising an elastic matrix material; and
   a memory metal layer covering an outer side of the elastic layer.

2. The roller according to claim 1, wherein the memory metal layer comprises nickel-titanium alloy.

3. The roller according to claim 1, wherein the memory metal layer has a radial thickness between about 2 μm and about 30 μm.

4. The roller according to claim 3, wherein the memory metal layer has a radial thickness between about 5 μm and about 10 μm.

5. The roller according to claim 1, wherein the surface of the memory metal layer has a Ra value which is less than about 0.05 μm.

6. The roller according to claim 5, wherein the surface of the memory metal layer has a Ra value which is less than about 0.03 μm.

7. The roller according to claim 1, wherein at least one filler is embedded in the elastic coating layer.

8. The roller according to claim 7, wherein the at least one filler has a greater stiffness than a stiffness of the elastic matrix material.

9. The roller according to claim 7, wherein the at least one filler has a greater thermal conductivity than a thermal conductivity of the matrix material.

10. The roller according to claim 7, wherein the at least one filler has a thermal expansion coefficient less than a thermal expansion coefficient of the matrix material and is essentially of a same magnitude as a thermal expansion coefficient of the roller core.

11. The roller according to claim 7, wherein the at least one filler comprises at least one of carbon, glass, and metal.

12. The roller according to claim 7, wherein the at least one filler comprises fiber or roving.

13. The roller according to claim 12, wherein the fiber comprises aramide.

14. The roller according to claim 12, wherein at least a portion of the fiber is oriented in an axial direction.

15. The roller according to claim 12, wherein at least a preponderant portion of the fiber is oriented in an radial direction.

16. The roller according to claim 12, wherein at least a portion of the fiber is oriented by statistical distribution.

17. The roller according to claim 12, wherein at least a preponderant portion of the fiber is oriented by statistical distribution.

18. The roller according to claim 12, wherein the fiber is arranged in a fiber layer.

19. The roller according to claim 12, wherein the fiber is arranged in radially stacked fiber layers.

20. The roller according to claim 9, wherein the elastic coating layer comprises at least one further filler comprising one of a fiber and a powder.

21. The roller according to claim 20, wherein the at least one further filler comprises at least one of quartz and polytetrafluoroethylene.

22. The roller according to claim 1, wherein the matrix material is a plastic material comprising one of thermosetting resin and thermoplastic material.

23. The roller according to claim 1 wherein the matrix material is a resin/hardener combination.

24. A roller for smoothing a paper web comprising:

a hard metal roller core;

an elastic coating layer coated upon the roller core, the elastic coating layer comprising an elastic matrix material with at least one filler embedded therein; and a memory metal layer covering an outer layer of the elastic coating layer, wherein the memory metal layer is deformable and is adapted to return to an original shape.

25. The roller according to claim 24, wherein the memory metal layer comprises nickel-titanium alloy.

26. The roller according to claim 25, wherein the memory metal layer comprises one of a plurality of metal fibers.

27. The roller according to claim 26, wherein the memory metal layer comprises a plurality of metal coated aramide fibers.

28. The roller according to claim 27, wherein the memory metal layer has a radial thickness between about 5 $\mu$m and about 10 $\mu$m.

29. The roller according to claim 28, wherein the surface of the memory metal layer has a Ra value which is less than about 0.03 $\mu$m.

30. The roller according to claim 24, wherein the at least one filler has a greater stiffness than a stiffness of the elastic matrix material, wherein the at least one filler has a greater thermal conductivity than a thermal conductivity of the matrix material, and wherein the at least one filler has a thermal expansion coefficient less than a thermal expansion coefficient of the matrix material and is essentially of a same magnitude as a thermal expansion coefficient of the roller core.

31. A device for smoothing a paper web comprising:

an elastic roller which comprises a hard metal roller core, an elastic coating layer, including an elastic matrix material, coated upon the roller core, and a memory metal layer covering the elastic coating layer;

a hard roller; and a pressure nip formed between the elastic roller and the hard roller, wherein the memory metal layer is deformable and adapted to resume its original shape.

32. The device according to claim 31, wherein at least one filler is embedded in the elastic matrix layer, the at least one filler having a greater thermal conductivity than the thermal conductivity of the matrix material and the at least one filler having a thermal expansion coefficient less than the thermal expansion coefficient of the matrix material and being essentially of the same magnitude as the thermal expansion coefficient of the roller core.

33. A method for smoothing a paper web comprising forming a pressure nip between an elastic roller and a hard roller, the elastic roller comprising a hard metal roller core, an elastic coating layer, including an elastic matrix material, coated upon the roller core roll, and a memory metal layer covering the elastic coating layer, wherein the memory metal layer is deformable and adapted to resume its original shape; and passing the paper web through the pressure nip, whereby the paper web is smoothed.

34. The method according to claim 33, wherein at least one filler is embedded in the elastic matrix layer and the at least one filler has a greater stiffness than a stiffness of the elastic matrix material.

35. The method according to claim 34, wherein the at least one filler is fiber or roving.

36. The method according to claim 33, wherein at least one filler is embedded in the elastic matrix layer, the at least one filler having a greater thermal conductivity than a thermal conductivity of the matrix material and the at least one filler having a thermal expansion coefficient less than a thermal expansion coefficient of the matrix material and being essentially of a same magnitude as a thermal expansion coefficient of the roller core.

37. The method according to claim 36, wherein the at least one filler is fiber or roving and further comprising heating the memory metal layer to a temperature greater than a temperature at which the memory layer is deformed, whereby the memory metal layer resumes its original shape.

38. A roller for smoothing a paper web comprising:

a hard metal roller core;

an elastic coating layer coated upon the roller core, the elastic coating layer comprising an elastic matrix material with at least one filler embedded therein; and a memory metal layer covering an outer layer of the elastic coating layer, wherein the memory metal layer is deformable and is adapted to return to an original shape, wherein the memory metal layer comprises a plurality of metals.

* * * * *